(12) United States Patent
Minoshima et al.

(10) Patent No.: US 9,013,767 B2
(45) Date of Patent: Apr. 21, 2015

(54) IMAGE READING APPARATUS AND METHOD FOR MANUFACTURING THE SAME

(71) Applicants: Saya Minoshima, Gifu (JP); Masamitsu Ukai, Nagoya (JP)

(72) Inventors: Saya Minoshima, Gifu (JP); Masamitsu Ukai, Nagoya (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/226,139

(22) Filed: Mar. 26, 2014

(65) Prior Publication Data

US 2014/0293377 A1    Oct. 2, 2014

(30) Foreign Application Priority Data

Mar. 29, 2013 (JP) ................................ 2013-071210

(51) Int. Cl.
*H04N 1/04* (2006.01)
*H04N 1/12* (2006.01)
*H04N 1/193* (2006.01)
*H04N 1/203* (2006.01)

(52) U.S. Cl.
CPC ............ *H04N 1/12* (2013.01); *Y10T 29/49826* (2015.01); *H04N 1/193* (2013.01); *H04N 1/2034* (2013.01); *H04N 2201/0081* (2013.01); *H04N 2201/0446* (2013.01)

(58) Field of Classification Search
CPC ............... H04N 1/193; H04N 1/2034; H04N 2201/0081; H04N 2201/0446
USPC .................................. 358/498, 474, 497, 496
See application file for complete search history.

(56) References Cited

U.S. PATENT DOCUMENTS 8,787,652 B1 *  7/2014  Jones et al. ................... 382/135

FOREIGN PATENT DOCUMENTS

JP          2009303085 A      12/2009

* cited by examiner

*Primary Examiner* — Houshang Safaipour
(74) *Attorney, Agent, or Firm* — Merchant & Gould PC

(57) ABSTRACT

An image reading apparatus including: a conveyor; a first reading unit; a second reading unit; a first frame; and a second frame. The first reading unit extends in a prescribed direction and has a first end on a first side and a third end on a second side opposite to the first side in the prescribed direction. The second reading unit extends in the prescribed direction and has a second end on the first side and a fourth end on the second side. The second reading unit is disposed opposite to the first reading unit with a conveying path along which a sheet is conveyed interposed therebetween. The first frame includes first and second engagement portions configured to be engaged with the first and second ends, respectively. The second frame includes third and fourth engagement portions configured to be engaged with the third and fourth ends, respectively.

14 Claims, 12 Drawing Sheets

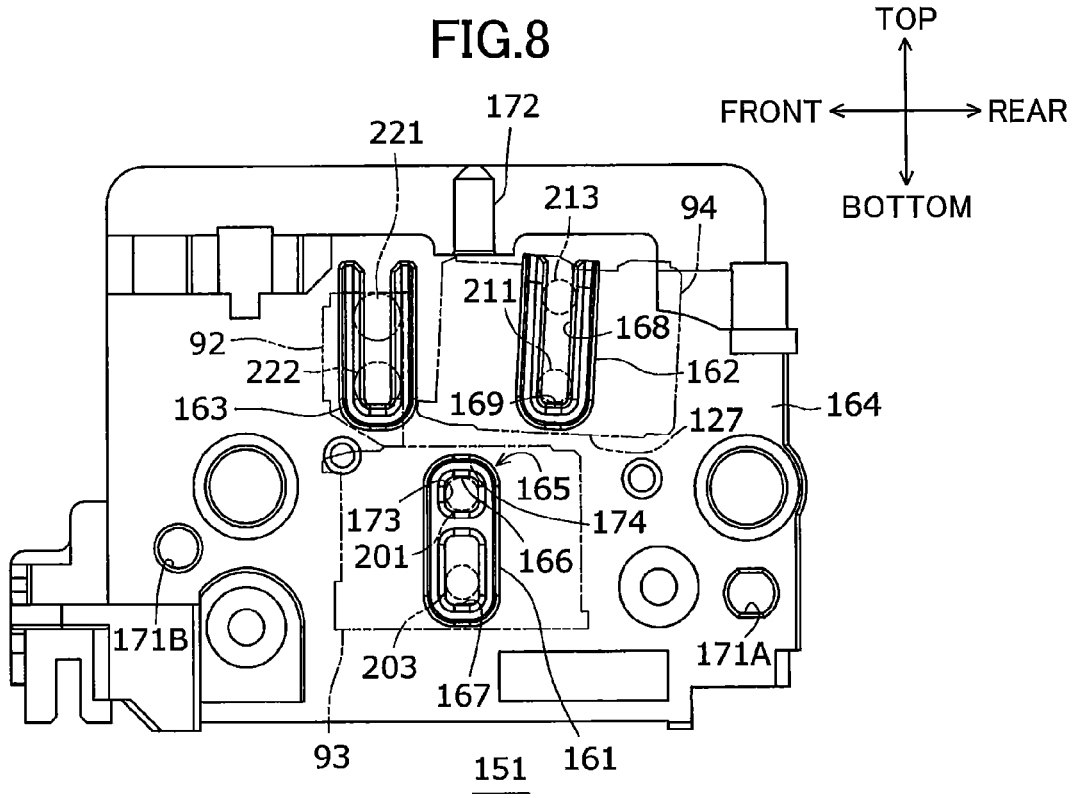
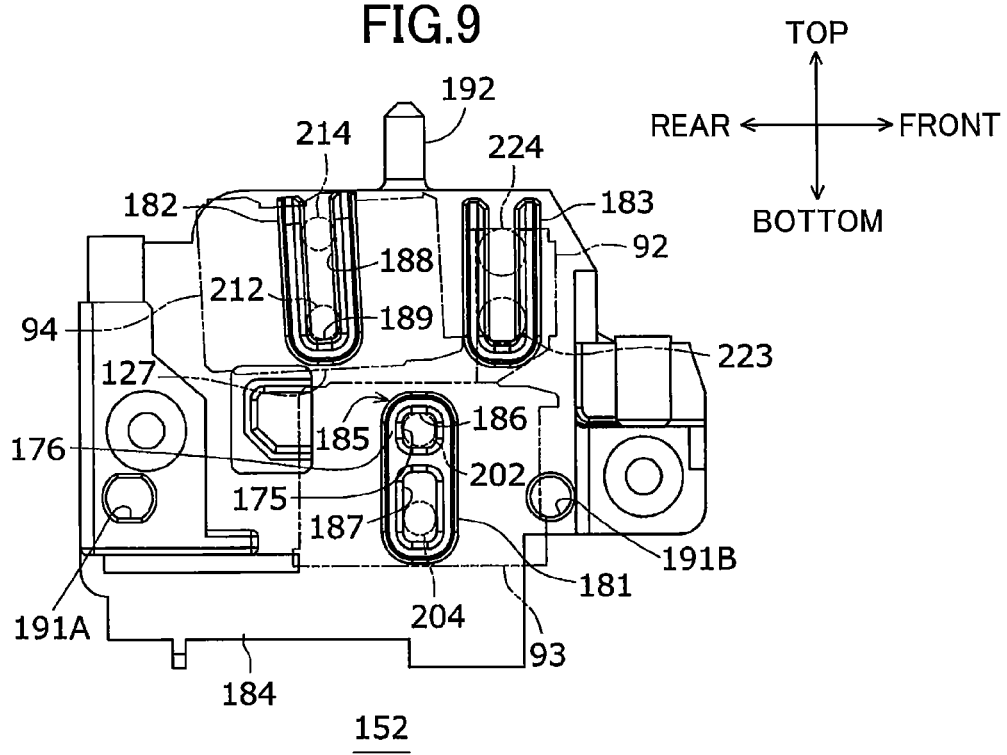

ved by the conveyor along the conveying path. The first reading unit extends in the prescribed direction and has a first end on the first side and a third end on the second side. The second reading unit is configured to read an image from a second surface of the sheet conveyed by the conveyor along the conveying path. The second reading unit extends in the prescribed direction and has a second end on the first side and a fourth end on the second side The second reading unit is disposed opposite to the first reading unit with the conveying path interposed therebetween. The first frame includes: a first engagement portion configured to be engaged with the first end; and a second engagement portion configured to be engaged with the second end. The second frame includes: a third engagement portion configured to be engaged with the third end; and a fourth engagement portion configured to be engaged with the fourth end.

IMAGE READING APPARATUS AND METHOD FOR MANUFACTURING THE SAME

CROSS REFERENCE TO RELATED APPLICATION

This application claims priority from Japanese Patent Application No. 2013-071210 filed Mar. 29, 2013. The entire content of the priority application is incorporated herein by reference.

TECHNICAL FIELD

The present invention relates to an image reading apparatus and a method for manufacturing the image reading apparatus.

BACKGROUND

There is conventionally known an image reading apparatus having a configuration including a first reading unit and a second reading unit. Further, in this image reading apparatus, a first block member and a second block member are provided one above the other across a conveying path. The first reading unit is retained in the first block member with a first reading surface thereof facing the conveying path. The second reading unit is retained in the second block member with a second reading surface thereof facing the conveying path.

When an upper surface of a sheet passes on the first reading surface while the sheet is conveyed along the conveying path, an image on the upper surface is read by the first reading unit. Further, when a lower surface of the sheet passes on the second reading surface while the sheet is conveyed along the conveying path, an image on the lower surface is read by the second reading unit.

SUMMARY

In the above-described configuration, a relative position between the first reading surface and the second reading surface is determined by a relative position between the first reading unit and the first block member; a relative position between the second reading unit and the second block member; and a relative position between the first block member and the second block member. Thus, the relative position between the first reading surface and the second reading surface is subjected to dimensional tolerances of components constituting the first block member and the second block member. The first reading surface and the second reading surface define the conveying path therebetween, so that when a variation occurs in the relative position between the first reading surface and the second reading surface, there can be a variation in image reading accuracy of the first reading unit and the second reading unit.

In view of the foregoing, it is an object of the present invention to provide an image reading apparatus capable of enhancing image reading accuracy of a first reading unit and a second reading unit, and to provide a manufacturing method for the image reading apparatus.

In order to attain the above and other objects, the present invention provides an image reading apparatus including: a conveyor; a first reading unit; a second reading unit; a first frame; and a second frame. The conveyor configured to convey a sheet along a conveying path. The conveyor includes a roller, and a shaft configured to support the roller. The shaft extends in a prescribed direction and defines a first side and a second side opposite to the first side in the prescribed direction. The first reading unit is configured to read an image from a first surface of the sheet conveyed by the conveyor along the conveying path. The first reading unit extends in the prescribed direction and has a first end on the first side and a third end on the second side. The second reading unit is configured to read an image from a second surface of the sheet conveyed by the conveyor along the conveying According to another aspect, the present invention provides a method for manufacturing an image reading apparatus including: a conveyor; a first reading unit; a second reading unit; a first frame; and a second frame. The conveyor is configured to convey a sheet along a conveying path. The conveyor includes a roller, and a shaft configured to support the roller. The shaft extends in a prescribed direction and defines a first side and a second side opposite to the first side in the prescribed direction. The first reading unit is configured to read an image from a first surface of the sheet conveyed by the conveyor along the conveying path. The first reading unit extends in the prescribed direction and has a first end on the first side and a third end on the second side. The first reading unit includes a first protrusion protruding from the first end in the prescribed direction and a third protrusion protruding from the third end in the prescribed direction. The second reading unit is configured to read an image from a second surface of the sheet conveyed by the conveyor along the conveying path. The second reading unit extends in the prescribed direction and has a second end on the first side and a fourth end on the second side. The second reading unit includes a second protrusion protruding from the second end in the prescribed direction and a fourth protrusion protruding from the fourth end in the prescribed direction. The second reading unit being disposed opposite to the first reading unit with the conveying path interposed therebetween. The first frame includes a first engagement portion that is in a form of a recess recessed in the prescribed direction and a second engagement portion that is in a form of a recess recessed in the prescribed direction and opening upward. The second frame includes a third engagement portion that is in a form of a recess recessed in the prescribed direction and a fourth engagement portion that is in a form of a recess recessed in the prescribed direction and opening upward. The method includes: bringing the first end and the first frame close to each other in the prescribed direction to insert the first protrusion into the first engagement portion; bringing the third end and the second frame close to each other in the prescribed direction to insert the third protrusion into the third engagement portion; and positioning the second reading unit above the first reading unit and between the first frame and the second frame to insert the second protrusion and the fourth protrusion into the second engagement portion and the fourth engagement portion, respectively.

Incidentally, first "bringing" may be performed after second "bringing" is performed. Further, after first "bringing" and second "bringing" are performed, "positioning" is performed.

According to still another aspect, the present invention provides an image reading apparatus including: a first reading unit; a second reading unit; a first frame; and a second frame. The first reading unit is configured to read an image from a first surface of a sheet conveyed along a conveying path in a sheet conveyance direction. The sheet has a width extending in a widthwise direction perpendicular to the sheet conveyance direction and defines a first side and a second side opposite to the first side in the widthwise direction. The first reading unit extends in the widthwise direction and has a first end on the first side and a third end on the second side. The second reading unit is configured to read an image from a second surface of the sheet. The second reading unit extends in the widthwise direction and has a second end on the first side and a fourth end on the second side. The second reading unit is disposed opposite to the first reading unit with the conveying path interposed therebetween. The first frame includes: a first engagement portion configured to be engaged with the first end; and a second engagement portion configured to be engaged with the second end. The second frame includes: a third engagement portion configured to be engaged with the third end; and a fourth engagement portion configured to be engaged with the fourth end.

BRIEF DESCRIPTION OF THE DRAWINGS

In the drawings;

FIG. 8 is a right side view of the first frame;

FIG. 9 is a left side view of the second frame;

DETAILED DESCRIPTION

An image reading apparatus according to one embodiment of the present invention will be described with reference to FIGS. 1 and 11.

<Casing>

Figure 1:
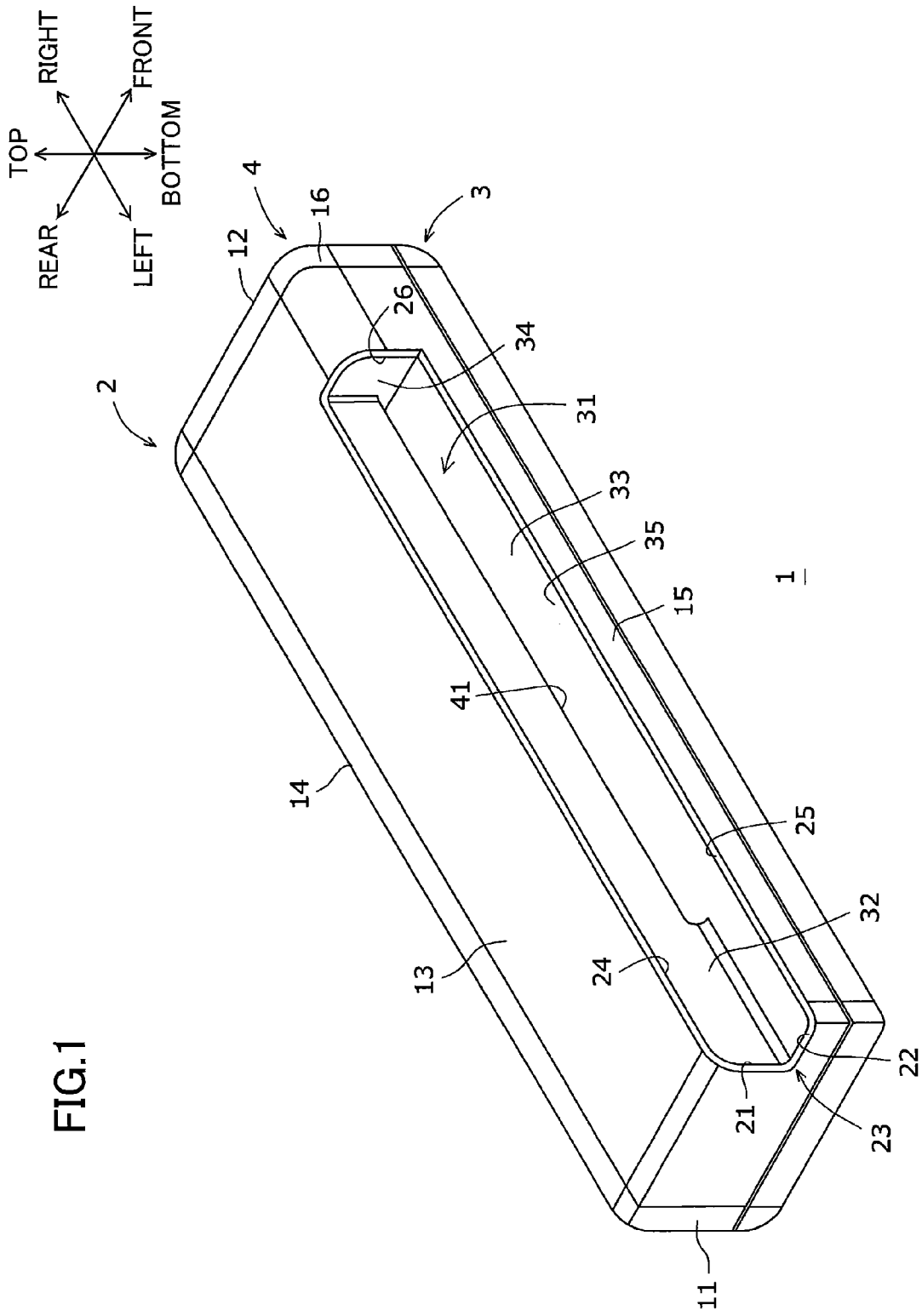
FIG. 1 is a perspective view of an image reading apparatus according to one embodiment of the present invention as viewed from an upper front left side.
Figure 2:
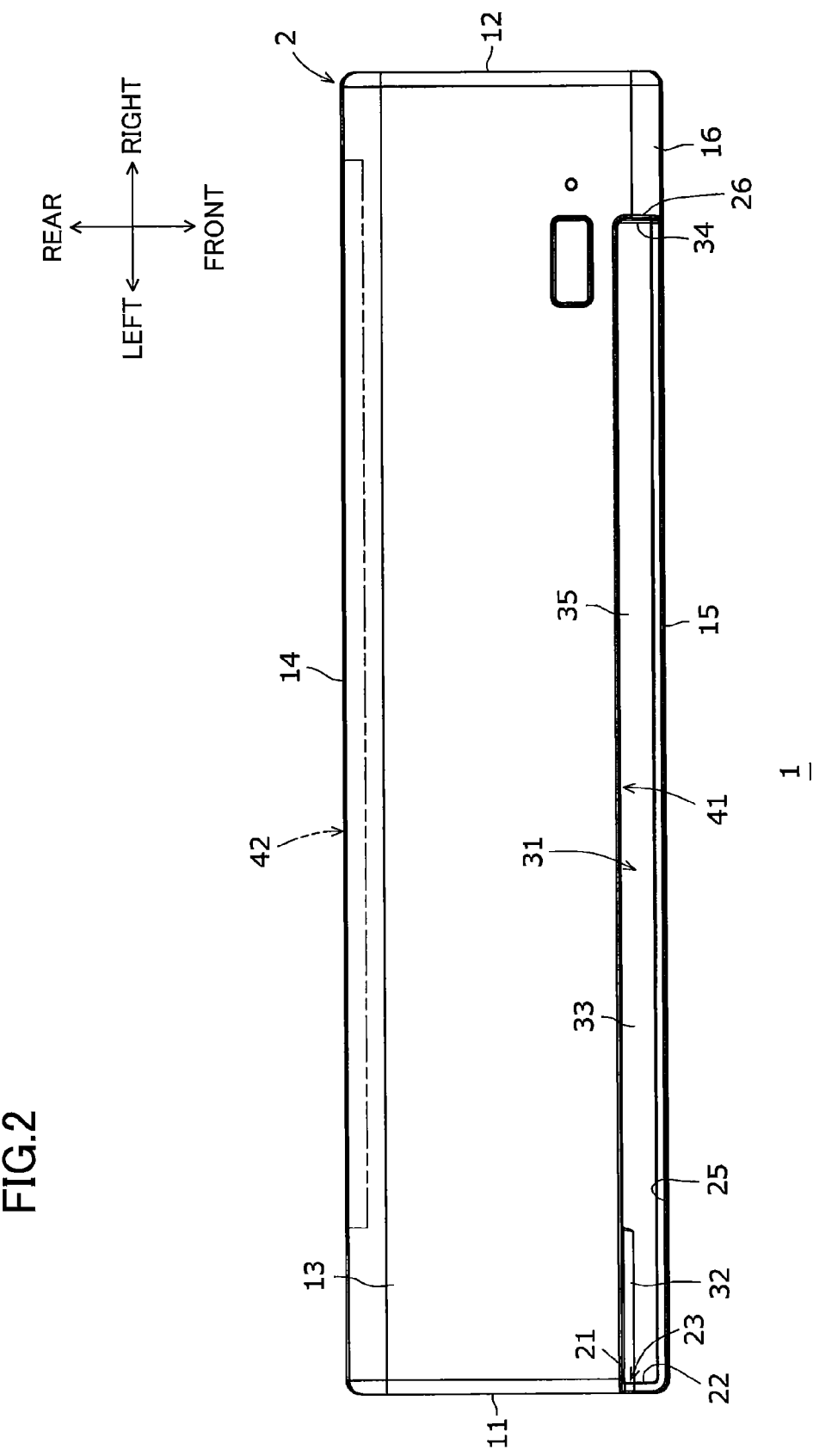
FIG. 2 is a plan view of the image reading apparatus.
Figure 3:
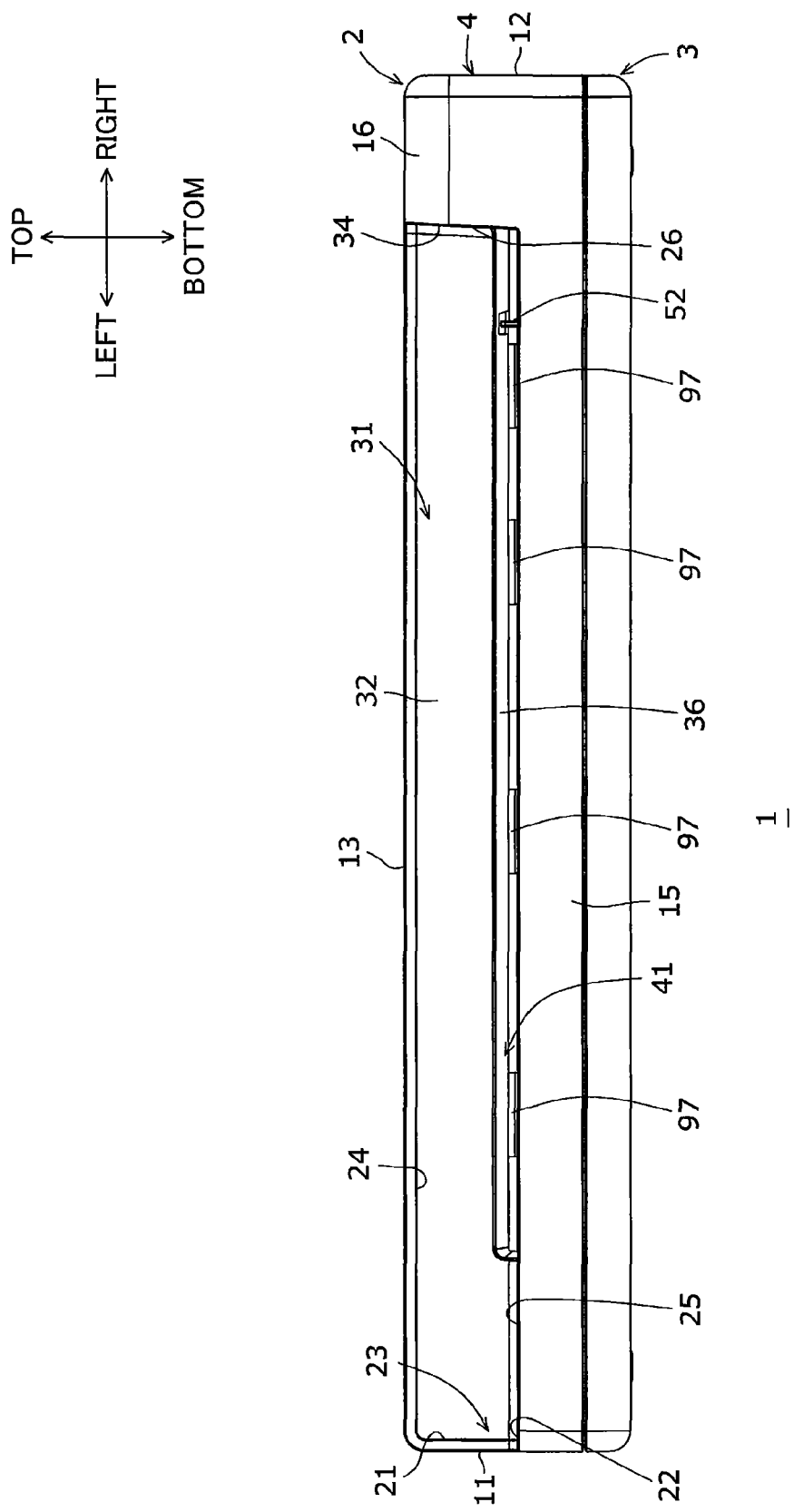
FIG. 3 is a front view of the image reading apparatus.
Figure 4:
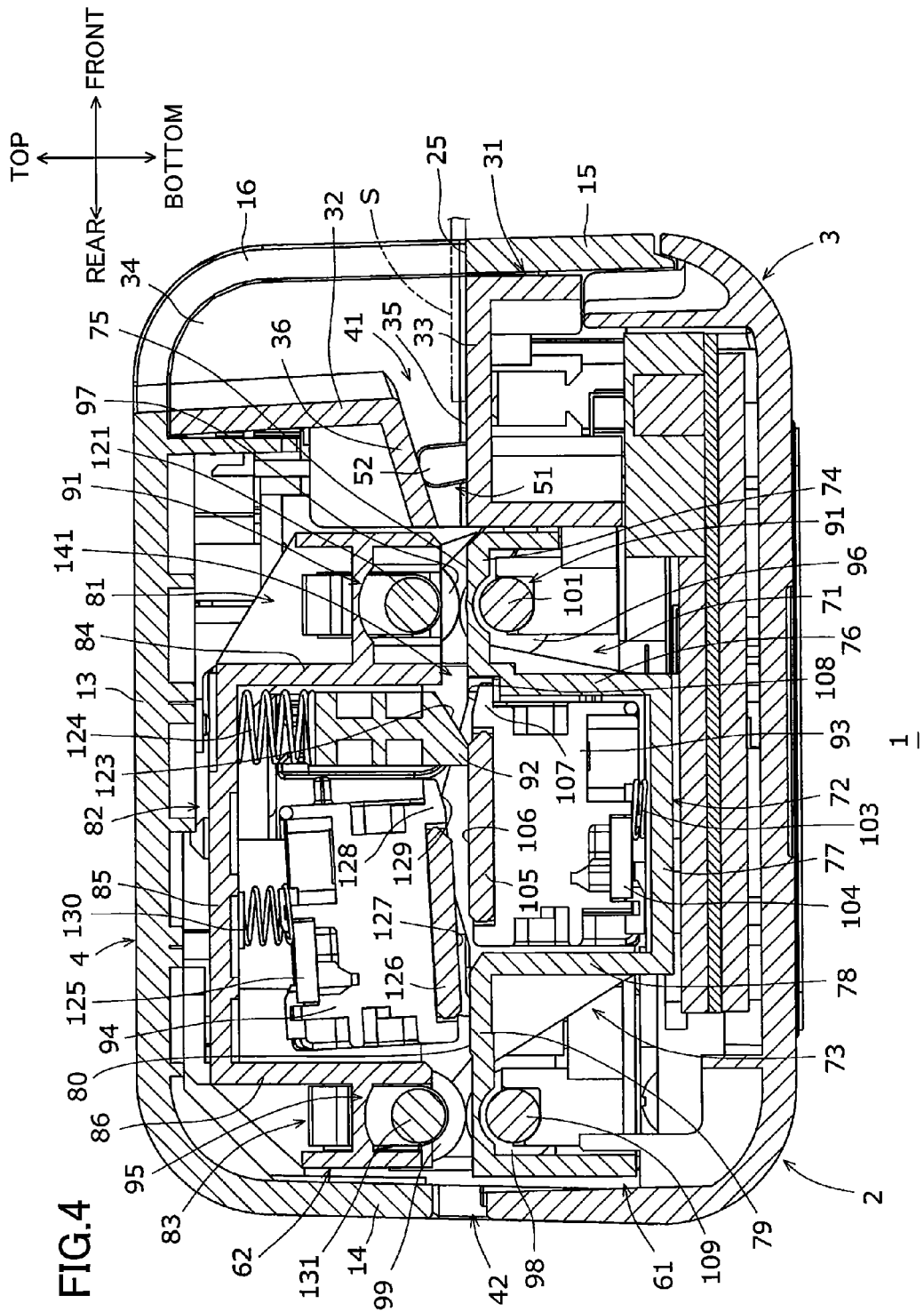
FIG. 4 is a cross-sectional view of the image reading apparatus taken along a plane extending in a front-rear direction.

As illustrated in FIGS. 1 through 4, the image reading apparatus 1 includes a casing 2. As illustrated in FIGS. 1, 3, and 4, the casing 2 is divided into two parts. That is, the casing 2 includes a bottom cover 3 and a top cover 4.

Throughout the specification, the terms "upward", "downward", "upper", "lower", "above", "below", "beneath", "right", "left", "front", "rear" and the like will be used assuming that the image reading apparatus 1 is disposed in an orientation in which it is intended to be used as illustrated in FIG. 1. More specifically, directions related to the image reading apparatus 1 will be defined with a top cover 4 side relative to the bottom cover 3 referred to as "top side" and an inlet port 41 (described later) side relative to the center of the image reading apparatus 1 in a plan view referred to as "front side". Throughout the drawings, the directions are indicated by direction arrows.

As illustrated in FIGS. 1, 3, and 4, the top cover 4 overlaps the bottom cover 3 from above. As illustrated in FIG. 2, the top cover 4 includes a left wall 11, a right wall 12, an upper wall 13, a rear wall 14, a front wall 15, and a curved portion 16.

The left wall 11 extends in a vertical direction and in a front-rear direction. As illustrated in FIGS. 1, 2, and 3, an upper-front end portion of the left wall 11 is cut out. As a result, the left wall 11 has, at the upper-front end portion, a first edge 21 and a second edge 22. The first edge 21 extends in the vertical direction. The second edge 22 extends frontward from a lower end of the first edge 21. In other words, the left wall 11 has, at the upper-front end portion, a cutout 23 formed by the first edge 21 extending in the vertical direction and the second edge 22 extending frontward from the lower end of the first edge 21.

The right wall 12 is disposed spaced apart from the left wall 11 in a left-right direction. The right wall 12 extends, in parallel to the left wall 11, in the vertical direction and in the front-rear direction.

The upper wall 13 is disposed between an upper end of the left wall 11 and an upper end of the right wall 12. The upper wall 13 extends in the left-right direction and in the front-rear direction. The upper wall 13 has a third edge 24 at its front end. The third edge 24 extends rightward from an upper end of the first edge 21 of the left wall 11. The third edge 24 has a length smaller than an interval between the left wall 11 and the right wall 12 in the left-right direction.

As illustrated in FIG. 2, the rear wall 14 is disposed between a rear end of the left wall 11 and a rear end of the right wall 12. The rear wall 14 extends in the vertical direction and in the left-right direction. As illustrated in FIG. 4, an upper end of the rear wall 14 is connected to a rear end of the upper wall 13.

As illustrated in FIGS. 1 and 3, the front wall 15 is disposed between a front end of the left wall 11 and a front end of the right wall 12. The front wall 15 has a fourth edge 25 at its upper end. The fourth edge 25 extends rightward from a front end of the second edge 22 of the left wall 11. The fourth edge 25 has a length equal to that of the third edge 24 of the upper wall 13.

As illustrated in FIGS. 1, 2, and 3, the curved portion 16 is disposed between a front-right end portion of the upper wall 13 and an upper-right end portion of the front wall 15. A right end of the curved portion 16 is connected to an upper-front end portion of the right wall 12. The curved portion 16 has a fifth edge 26 at its left end. The fifth edge 26 extends frontward from a right end of the third edge 24, curved in the middle thereof, and extends downward to be connected to a right end of the fourth edge 25.

The top cover 4 includes a front frame 31.

The front frame 31 includes a first wall 32, a second wall 33, a third wall 34, and a fourth wall 36.

As illustrated in FIGS. 1 and 3, the first wall 32 extends in the vertical direction and in the left-right direction. A left end of the first wall 32 is connected to the first edge 21 of the left wall 11. An upper end of the first wall 32 is connected to the third edge 24 of the upper wall 13.

As illustrated in FIGS. 1 and 2, the second wall 33 extends in the left-right direction and in the front-rear direction. A left end of the second wall 33 is connected to the second edge 22 of the left wall 11. A front end of the second wall 33 is connected to the fourth edge 25 of the front wall 15.

As illustrated in FIGS. 1 and 4, the third wall 34 extends in the vertical direction and in the front-rear direction. The third wall 34 is connected to the fifth edge 26. A rear end of the third wall 34 is connected to the first wall 32. A lower end of the third wall 34 is connected to the second wall 33.

As illustrated in FIGS. 1 and 3, a lower end portion of the first wall 32 is opened, excluding a left end portion thereof. As a result, the inlet port 41 is formed at a position surrounded by the L-shaped first wall 32, the second wall 33, and the third wall 34.

As illustrated in FIGS. 3 and 4, the fourth wall 36 extends in a lower-rear direction from the lower end portion of the first wall 32 at which the opening (i.e. inlet port 41) is formed. A lower-rear end of the fourth wall 36 is positioned above and spaced apart form a rear end of the second wall 33. Further, a lower-rear end portion of the third wall 34 extends between a right end of the fourth wall 36 and a right end of the second wall 33. Upper and lower edges of the lower-rear end portion of the third wall 34 are connected to the fourth wall 36 and the second wall 33, respectively.

Further, as illustrated in FIG. 4, the casing 2 has a discharge port 42 between the bottom cover 3 and the rear wall 14 of the top cover 4. The discharge port 42 is formed at a position substantially the same as that of the inlet port 41 in the vertical direction and in the left-right direction.

<Internal Structure>

The image reading apparatus 1 includes a first holder 61 and a second holder 62.

The first holder 61 (as an example of a first accommodating portion) includes a first lower retaining portion 71, a second lower retaining portion 72, and a third lower retaining portion 73. The first lower retaining portion 71, the second lower retaining portion 72, and the third lower retaining portion 73 are arranged in this order from front to rear.

The first lower retaining portion 71 has a front chute 74 (as an example of a chute). The front chute 74 extends in the left-right direction and in the front-rear direction. An upper surface 75 of the front chute 74 is positioned at a height flush with an upper surface 35 of the second wall 33.

The second lower retaining portion 72 includes a front wall 76, a bottom wall 77, and a rear wall 78. The front wall 76 extends downward from a rear end of the front chute 74. The bottom wall 77 extends rearward from a lower end of the front wall 76. The rear wall 78 extends upward from a rear end of the bottom wall 77.

The third lower retaining portion 73 has a rear chute 79 (as an example of a chute). The rear chute 79 extends rearward from an upper end of the rear wall 78 of the second lower retaining portion 72. A rear end portion of an upper surface 80 of the rear chute 79 is positioned at a height higher than a lower end of the discharge port 42.

The second holder 62 (as an example of a second accommodating portion) is disposed above an imaginary plane containing the upper surface 35 of the second wall 33. The second holder 62 includes a first upper retaining portion 81, a second upper retaining portion 82, and a third upper retaining portion 83. The first upper retaining portion 81, the second upper retaining portion 82, and the third upper retaining portion 83 are arranged in this order from front to rear.

The second upper retaining portion 82 includes a front wall 84, an upper wall 85 and a rear wall 86. The front wall 84 is disposed at a position substantially the same as that of the front wall 76 of the first holder 61 in the front-rear direction. The front wall 84 extends in the vertical direction and in the left-right direction. The upper wall 85 extends rearward from an upper end of the front wall 84. The rear wall 86 extends downward from a rear end of the upper wall 85 and in parallel to the front wall 84. The rear wall 86 is disposed rearward of the rear wall 78 of the first holder 61 in the front-rear direction.

The image reading apparatus 1 further includes a pair of conveying rollers 91 (as an example of a conveyor), a sheet holder 92, a first reading unit 93, a second reading unit 94, and a pair of discharge rollers 95 (as an example of a conveyor).

The pair of conveying rollers 91 includes four conveying drive rollers 96 (as an example of a roller), four conveying driven rollers 97 (as an example of a roller), a drive shaft 101 (as an example of a shaft), and a driven shaft 121 (as an example of a shaft).

The drive shaft 101 supports the four conveying drive rollers 96. The drive shaft 101 extends in the left-right direction (as an example of a prescribed direction). The drive shaft 101 is rotatably supported to the first lower retaining portion 71 of the first holder 61. A part of an outer peripheral surface of each of the conveying drive rollers 96 protrudes upward from the upper surface 75 of the front chute 74.

The driven shaft 121 supports the four conveying driven rollers 97. The driven shaft 121 extends in the left-right direction (as an example of a prescribed direction). The driven shaft 121 is rotatably supported to the first upper retaining portion 81 of the second holder 62. The conveying driven rollers 97 are disposed above the respective conveying drive rollers 96. A part of an outer peripheral surface of each of the conveying driven rollers 97 contacts the outer peripheral surface of the corresponding conveying drive roller 96.

The sheet holder 92 is disposed rearward of the front wall 84 of the second holder 62. The sheet holder 92 extends in the vertical direction and in the left-right direction. The sheet holder 92 is provided separately from the second reading unit 94. A lower end portion of the sheet holder 92 is positioned on a front end portion of a transparent plate 105 of the first reading unit 93. The sheet holder 92 has, at its lower end, a sloped surface 123 inclined upward toward the front. Further, the sheet holder 92 is pressed downward by a compression coil spring 124. One end (upper end) of the compression coil spring 124 is connected to the upper wall 85 of the second holder 62. The other end (lower end) of the compression coil spring 124 is connected to an upper end of the sheet holder 92.

The first reading unit 93 is elongated in the left-right direction (as an example of a prescribed direction), and disposed in the second lower retaining portion 72 of the first holder 61. More specifically, the first reading unit 93 is disposed above the bottom wall 77 of the first holder 61 and interposed between the front wall 76 and the rear wall 78 in the front-rear direction. The first reading unit 93 is biased by a first biasing portion 103 toward the second reading unit 94, that is, toward a conveying path 141 (described later). The first biasing portion 103 includes a compression coil spring. The first biasing portion 103 is interposed between the bottom wall 77 of the first holder 61 and the first reading unit 93. The first reading unit 93 is configured of a contact-type image sensor unit provided with an LED light source (not illustrated), a lens (not illustrated), and an image sensor 104. The first reading unit 93 has the transparent plate 105 at its upper portion. An upper surface of the transparent plate 105 serves as a first reading surface 106. The first reading surface 106 is positioned at a height flush with the upper surface 75 of the front chute 74. Alternatively, the first reading surface 106 may be positioned at a height lower than the upper surface 75 of the front chute 74. Further, the first reading unit 93 has an extended portion 107 in front of the transparent plate 105. The extended portion 107 has an upper surface as a sloped surface 108 inclined downward toward the front.

Figure 5:
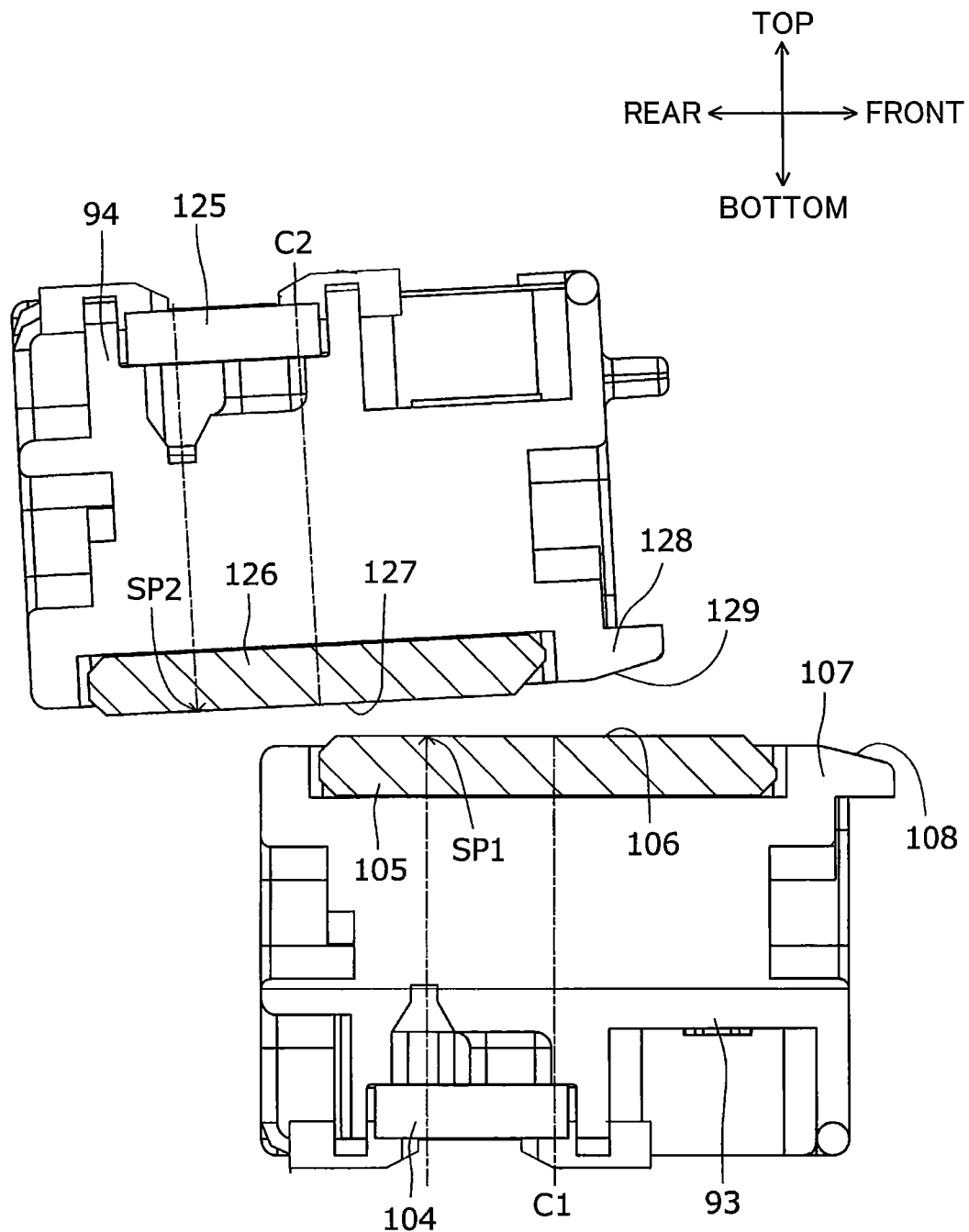
FIG. 5 is cross-sectional views of a first reading unit and a second reading unit provided in the image reading apparatus.

As illustrated in FIG. 5, an image reading position SP1 of the first reading unit 93 is off-centered to the rear in the first reading unit 93. More specifically, the image reading position SP1 is positioned rearward of a front-rear center C1 of the first reading unit 93.

The second reading unit 94 is elongated in the left-right direction (as an example of a prescribed direction), and disposed rearward of the sheet holder 92. The second reading unit 94 is positioned above the first reading unit 93 with the conveying path 141 (described later) interposed therebetween. Incidentally, the position of the second reading section 94 relative to the first reading section 93 is not limited to "above" as far as the conveying path 141 is interposed between the first reading section 93 and the second reading section 94. The second reading section 94 may be positioned below, frontward of, rearward of, leftward of, or rightward of the first reading section 93 with the conveying path 141 interposed therebetween. In other words, the positions of the first reading section 93 and the second reading section 94 delineated in FIG. 4 represents one example. The second reading unit 94 is configured of a contact-type image sensor unit having a configuration the same as that of the first reading unit 93. More specifically, the second reading unit 94 is configured of a contact-type image sensor unit provided with an LED light source (not illustrated), a lens (not illustrated), and an image sensor 125. Further, the second reading unit 94 has a transparent plate 126 at its lower portion. The second reading unit 94 has an arrangement obtained by turning upside down the first reading unit 93 with respect to an imaginary line extending in the front-rear direction.

A lower surface of the transparent plate 126 serves as a second reading surface 127. The second reading unit 94 is inclined in its entirety such that the second reading surface 127 obliquely extends upward toward the front. Further, the second reading unit 94 has an extended portion 128 in front of the transparent plate 126. The extended portion 128 has a lower surface as a sloped surface 129 inclined upward toward the front. Further, the second reading unit 94 is biased by a second biasing portion 130 toward the first reading unit 93, that is, toward the conveying path 141 (described later). The second biasing portion 130 includes a compression coil spring. The second biasing portion 130 is interposed between the upper wall 85 of the second holder 62 and the second reading unit 94.

As illustrated in FIG. 5, an image reading position SP2 of the second reading unit 94 is off-centered to the rear in the second reading unit 94. More specifically, the image reading position SP2 is positioned rearward of a front-rear center C2 of the second reading unit 94. Further, the image reading position SP2 is positioned rearward of the front-rear center C1 of the first reading unit 93.

The pair of discharge rollers 95 includes four discharge drive rollers 98 (as an example of a roller), four discharge driven rollers 99 (as an example of a roller), a drive shaft 109 (as an example of a shaft), and a driven shaft 131 (as an example of a shaft).

The drive shaft 109 supports the four discharge drive rollers 98. The drive shaft 109 extends in the left-right direction (as an example of a prescribed direction). The drive shaft 109 is rotatably supported to the third lower retaining portion 73 of the first holder 61. A part of an outer peripheral surface of each of the discharge drive rollers 98 protrudes upward from the upper surface 80 of the rear chute 79.

The driven shaft 131 supports the four discharge driven rollers 99. The driven shaft 131 extends in the left-right direction (as an example of a prescribed direction). The driven shaft 131 is rotatably supported to the third upper retaining portion 83 of the second holder 62. The discharge driven rollers 99 are disposed above the respective discharge drive rollers 98. A part of an outer peripheral surface of each of the discharge driven rollers 99 contacts the outer peripheral surface of the corresponding discharge drive roller 98.

The image reading apparatus 1 further includes a sensor 51.

The sensor 51 is configured of a microswitch, for example. The sensor 51 includes a body portion and an actuator 52. The body portion of the sensor 51 is disposed below the second wall 33. The actuator 52 penetrates through the second wall 33 in the vertical direction, and an upper end portion of the actuator 52 is disposed above the second wall 33. As illustrated in FIG. 3, the actuator 52 is positioned between the rightmost conveying driven roller 97 and the third wall 34 in the left-right direction.

<Reading Operation of Image from Sheet>

In the casing 2, the first holder 61 and the second holder 62 define the conveying path 141 therebetween. The conveying path 141 is a path along which a sheet S is conveyed. Incidentally, the sheet S is conveyed in a front-to-rear direction (sheet conveyance direction) along the conveying path 141. Further, the sheet S has a width in the left-right direction (widthwise direction).

The second wall 33 on which the sheet S to be inserted into the inlet port 41 is placed extends up to the left wall 11, so that the third wall 34 of the front frame 31 is exposed to the left. As a result, a user easily recognizes that the third wall 34 serves as a reference for setting a position of the sheet S with respect to the left-right direction.

In reading an image from the sheet S, the user inserts a single sheet S into the inlet port 41 along the upper surface 35 of the second wall 33. At this time, a right edge of the sheet S is aligned against the third wall 34.

Upon insertion of the sheet S into the inlet port 41, the sensor 51 detects the sheet S. In response to the detection of the sheet S by the sensor 51, the conveying drive rollers 96 and the discharge drive rollers 98 start rotating counter clockwise in FIG. 4. Following the rotation of the conveying drive rollers 96 and the discharge drive rollers 98, the conveying driven rollers 97 and the discharge driven rollers 99 start rotating clockwise in FIG. 4, respectively.

As the sheet S is inserted further rearward, a leading edge of the sheet S reaches the outer peripheral surfaces of the conveying drive rollers 96 and the outer peripheral surfaces of the conveying driven rollers 97. Then, a conveying force is applied from the conveying drive rollers 96 and the conveying driven rollers 97 to the sheet S. With application of the conveying force, the sheet S is conveyed rearward and passes between the conveying drive rollers 96 and the conveying driven rollers 97.

Thereafter, the leading edge of the sheet S abuts against the sloped surface 123 of the sheet holder 92. As the sheet S is conveyed, the leading edge of the sheet S slides along the sloped surface 123 toward the transparent plate 105 of the first reading unit 93. After being separated from the sloped surface 123, the leading edge of the sheet S enters between the sheet holder 92 and the first reading surface 106 which is the upper surface of the transparent plate 105. In this state, the sheet S is pressed against the first reading surface 106 by the sheet holder 92.

The sheet S passes on the first reading surface 106 while being pressed against the first reading surface 106. At this time, the sheet S on the first reading surface 106 is irradiated with light from the LED light source of the first reading unit 93. Then, reflected light from the sheet S is received by the image sensor 104, whereby an image on a lower surface (as an example of a first surface) of the sheet S is read.

As the sheet S is further conveyed, the leading edge of the sheet S abuts against the second reading surface 127 which is the lower surface of the transparent plate 126. Then, the leading edge of the sheet S abutting against the second reading surface 127 slides along the second reading surface 127. At this time, depending on a thickness of the sheet S, a force is applied from the sheet S to the second reading surface 127, and the second reading unit 94 moves upward against a biasing force of the second biasing portion 130.

Thereafter, the sheet S moves rearward along the second reading surface 127 with an upper surface thereof being in close contact with the second reading surface 127. At this time, the sheet S is irradiated with light from the LED light source of the second reading unit 94. Then, reflected light from the sheet S is received by the image sensor 125, whereby an image on the upper surface (as an example of a second surface) of the sheet S is read.

Then, when the leading edge of the sheet S reaches between the outer peripheral surfaces of the discharge drive rollers 98 and the outer peripheral surfaces of the discharge driven rollers 99, a conveying force is applied from the discharge drive rollers 98 and the discharge driven rollers 99 to the sheet S. With the application of the conveying force, the sheet S is conveyed rearward and discharged outside the casing 2 through the discharge port 42.

<Engagement Structure>

Figure 6:
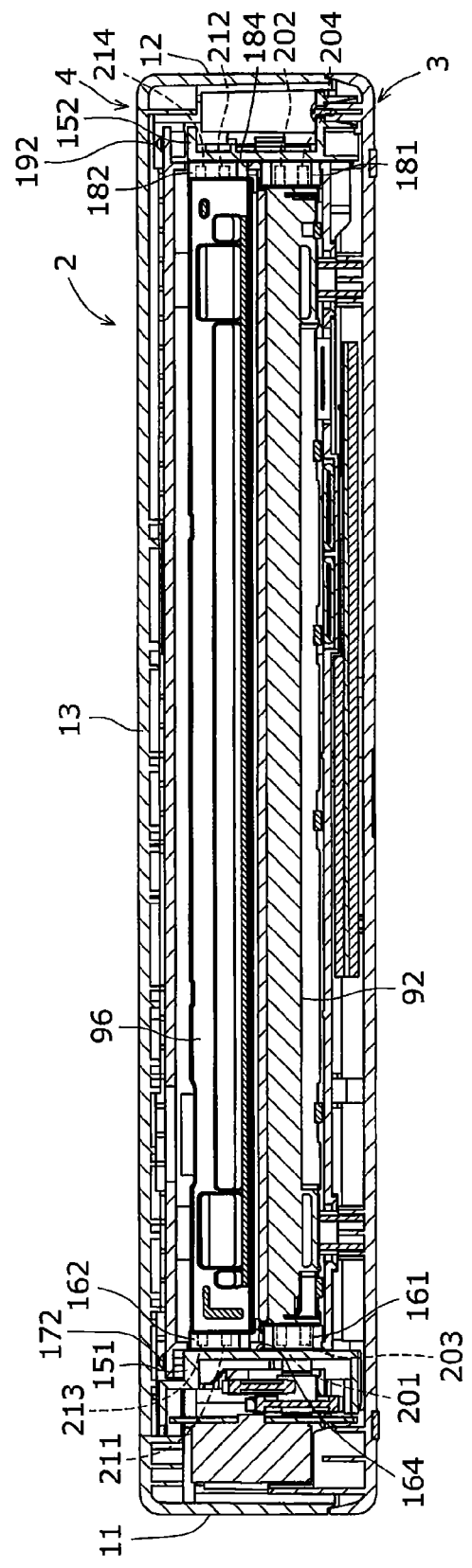
FIG. 6 is a cross-sectional view of the image reading apparatus taken along a plane extending in a left-right direction.
Figure 7:
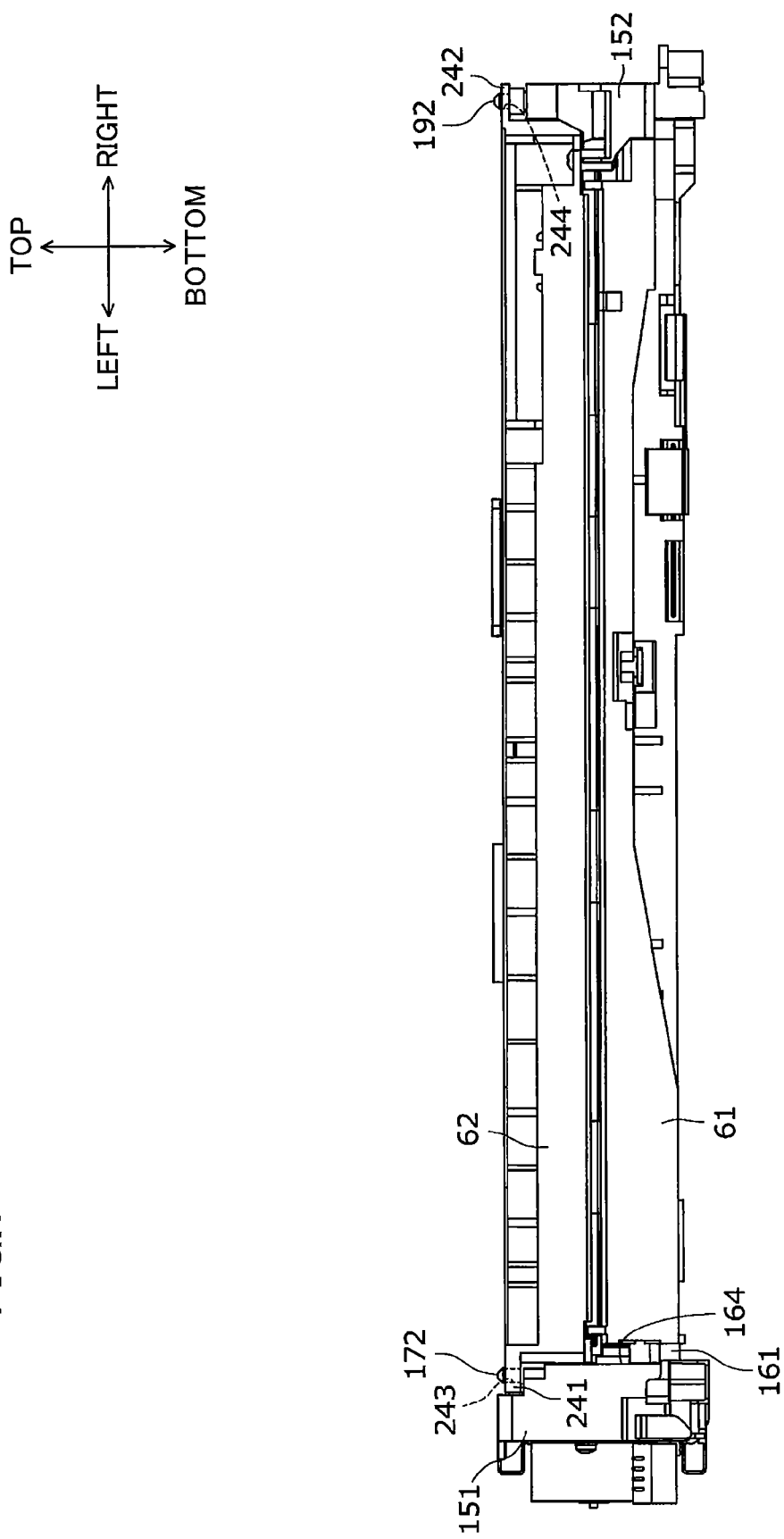
FIG. 7 is a front view illustrating a first holder, a second holder, a first frame, and a second frame provided in the image reading apparatus.

As illustrated in FIGS. 6 and 7, the image reading apparatus 1 further includes a first frame 151 and a second frame 152. The first holder 61 and the second holder 62 are each interposed between the first frame 151 and the second frame 152.

The first frame 151 is disposed leftward of the first holder 61 and the second holder 62. As illustrated in FIG. 8, the first frame 151 includes a first recessed portion 161, a second recessed portion 162, and a third recessed portion 163.

The first recessed portion 161 is formed at a right surface 164 of the first frame 151. The first recessed portion 161 is disposed at substantially a front-rear center of the right surface 164 and below a vertical center thereof. The first recessed portion 161 protrudes rightward from the right surface 164 and extends in the vertical direction. A first engagement portion 165 is provided in the first recessed portion 161. More specifically, a recess 173 is formed at an upper portion of the first recessed portion 161, and the recess 173 and an annular portion 174 surrounding the recess 173 constitute the first engagement portion 165. In other words, the first engagement portion 165 is in a form of a recess recessed leftward. A front-rear dimension of the recess 173 is substantially the same as a vertical dimension thereof. Further, the first engagement portion 165 has, at an upper end of the recess 173, a first abutment surface 166 extending in the front-rear direction.

Further, a recess 167 is formed in the first recessed portion 161. The recess 167 is disposed below the recess 173 and spaced apart therefrom. A front-rear dimension of the recess 167 is equal to a front-rear dimension of the recess 173. A vertical dimension of the recess 167 is larger than a vertical dimension of the recess 173.

The second recessed portion 162 is formed in the right surface 164 of the first frame 151. The second recessed portion 162 is disposed rearward of the front-rear center of the right surface 164 and above the vertical center thereof. The second recessed portion 162 has a generally U-shape with a top opening in a right side view. More specifically, the second recessed portion 162 protrudes rightward from the right surface 164 and extends obliquely with respect to the vertical direction such that an upper side thereof is positioned rearward than a lower side thereof. A second engagement portion 168 is provided in the second recessed portion 162. The second engagement portion 168 is in a form of a recess that is recessed leftward from a right surface of the second recessed portion 162 and opened upward. Further, the second recessed portion 162 has a second abutment surface 169 at a lower end of the second engagement portion 168. The second abutment surface 169 extends obliquely with respect to the front-rear direction such that a front side thereof is positioned upward than a rear side thereof.

The third recessed portion 163 is formed at the right surface 164 of the first frame 151. The third recessed portion 163 is disposed frontward of the front-rear center of the right surface 164 and at a position substantially the same as that of the second recessed portion 162 in the vertical direction. The third recessed portion 163 has a generally U-shape with a top opening in a right side view, protruding rightward from the right surface 164 and extending in the vertical direction.

Further, the first frame 151 includes two fifth engagement portions 171A, 171B, and a sixth engagement portion 172.

The fifth engagement portion 171A is a through-hole penetrating the first frame 151 in the left-right direction. The fifth engagement portion 171A is formed at a lower-rear end portion of the first frame 151. Similar to the fifth engagement portion 171A, the fifth engagement portion 171B is a through-hole penetrating the first frame 151 in the left-right direction. The fifth engagement portion 171B is formed at a lower-front end portion of the first frame 151. The fifth engagement portion 171B is disposed at a position the same as that of the fifth engagement portion 171A in the vertical direction.

The sixth engagement portion 172 is a shaft extending in the vertical direction and disposed at an upper end portion of the first frame 151.

The second frame 152 is disposed rightward of the first holder 61 and the second holder 62. As illustrated in FIG. 9, the second frame 152 includes a fourth recessed portion 181, a fifth recessed portion 182, and a sixth recessed portion 183.

The fourth recessed portion 181 is formed at a left surface 184 of the second frame 152. The fourth recessed portion 181 is disposed at substantially a front-rear center of the left surface 184 and below a vertical center thereof. That is, the fourth recessed portion 181 is disposed on the left surface 184 at a position substantially the same as that of the first recessed portion 161 of the first frame 151 in the vertical direction and in the front-rear direction. The fourth recessed portion 181 protrudes leftward from the left surface 184 of the second frame 152 and extends in the vertical direction. A third engagement portion 185 is provided in the fourth recessed portion 181. More specifically, a recess 175 is formed at an upper portion of the fourth recessed portion 181, and the recess 175 and an annular portion 176 surrounding the recess 175 constitute the third engagement portion 185. In other words, the third engagement portion 185 is in a form of a recess recessed rightward. A front-rear dimension of the recess 175 is substantially the same as a vertical direction thereof. Further, the third engagement portion 185 has, at an upper end of the recess 175, a third abutment surface 186 extending in the front-rear direction. The third abutment surface 186 is disposed at a position the same as that of the first abutment surface 166 of the first engagement portion 165 in the vertical direction.

Further, a recess 187 is formed in the fourth recessed portion 181. The recess 187 is disposed below the recess 175 and spaced apart therefrom. A front-rear dimension of the recess 187 is equal to a front-rear dimension of the recess 175. A vertical dimension of the recess 187 is larger than a vertical dimension of the recess 175.

The fifth recessed portion 182 is formed at the left surface 184 of the second frame 152. The fifth recessed portion 182 is disposed rearward of the front-rear center of the left surface 184 and above the vertical center thereof. That is, the fifth recessed portion 182 is disposed on the left surface 184 at a position substantially the same as that of the second recessed portion 162 of the first frame 151 in the vertical direction and in the front-rear direction. The fifth recessed portion 182 has a generally U-shape with a top opening in a left side view. More specifically, the fifth recessed portion 182 protrudes leftward from the left surface 184 and extends obliquely with respect to the vertical direction such that an upper side thereof is positioned rearward than a lower side thereof. That is, the fifth recessed portion 182 extends obliquely with respect to the vertical direction at an inclination angle the same as that of the second recessed portion 162. A fourth engagement portion 188 is provided in the fifth recessed portion 182. The fourth engagement portion 188 is in a form of a recess that is recessed rightward from a left surface of the fifth recessed portion 182 and opened upward. Further, the fifth recessed portion 182 has a fourth abutment surface 189 at a lower end of the fourth engagement portion 188. The fourth abutment surface 189 extends obliquely with respect to the front-rear direction such that a front side thereof is positioned upward than a rear side thereof. That is, the fourth abutment surface 189 is disposed at a position substantially the same as that of the second abutment surface 169 of the first frame 151 in the vertical direction and extends obliquely with respect to the front-rear direction at an inclination angle the same as that of the second abutment surface 169.

The sixth recessed portion 183 is formed at the left surface 184 of the second frame 152. The sixth recessed portion 183 is disposed frontward of the front-rear center of the left surface 184 and at a position substantially the same as that of the fifth recessed portion 182 in the vertical direction. That is, the sixth recessed portion 183 is disposed on the left surface 184 at a position the same as that of the third recessed portion 163 of the first frame 151 in the vertical direction and in the front-rear direction. The sixth recessed portion 183 has a U-shape with a top opening in a left side view, protruding leftward from the left surface 184 and extending in the vertical direction.

Further, the second frame 152 includes two seventh engagement portions 191A, 191B, and an eighth engagement portion 192.

The seventh engagement portion 191A is a through-hole penetrating the second frame 152 in the left-right direction. The seventh engagement portion 191A is formed at a lower-rear end portion of the second frame 152. Similar to the seventh engagement portion 191A, the seventh engagement portion 191B is a through-hole penetrating the second frame 152 in the left-right direction. The seventh engagement portion 191B is formed at a lower-front end portion of the second frame 152. The seventh engagement portion 191B is disposed at a position the same as that of the seventh engagement portion 191A in the vertical direction.

The eighth engagement portion 192 is a shaft extending in the vertical direction and disposed at an upper end portion of the second frame 152.

Further, as illustrated in FIG. 6, the first reading unit 93 includes a first protrusion 201 at its left end portion (as an example of a first end), and a third protrusion 202 at its right end portion (as an example of a third end). The first protrusion 201 protrudes leftward from the left end portion of the first reading unit 93. The third protrusion 202 protrudes rightward from the right end portion of the first reading unit 93. Incidentally, the left side is an example of a first side in a prescribed direction, and the right side is an example of a second side in a prescribed direction.

More specifically, as also denoted by broken lines in FIG. 8, the first protrusion 201 is provided on a left surface of the first reading unit 93 at substantially a front-rear center of an upper end portion thereof. The first protrusion 201 has a diameter substantially the same as the front-rear dimension of the first engagement portion 165 of the first frame 151. Further, the first reading unit 93 includes a protrusion 203 protruding leftward from the left surface of the first reading unit 93 at a position below the first protrusion 201 and spaced apart therefrom. The protrusion 203 has a diameter the same as that of the first protrusion 201.

As also denoted by broken lines in FIG. 9, the third protrusion 202 is provided on a right surface of the first reading unit 93 at substantially a front-rear center of an upper end portion thereof. That is, the third protrusion 202 is disposed on the right surface of the first reading unit 93 at a position substantially the same as that of the first protrusion 201 in the front-rear direction and in the vertical direction. The third protrusion 202 has a diameter substantially the same as the front-rear dimension of the third engagement portion 185 of the second frame 152. Further, the first reading unit 93 includes a protrusion 204 protruding rightward from the right surface of the first reading unit 93 at a position below the third protrusion 202 and spaced apart therefrom. The protrusion 204 has a diameter the same as that of the third protrusion 202.

Further, as illustrated in FIG. 6, the second reading unit 94 includes a second protrusion 211 at its left end portion (as an example of a second end), and a fourth protrusion 212 at its right end portion (as an example of a fourth end). The second protrusion 211 protrudes leftward from the left end portion of the second reading unit 94. The fourth protrusion 212 protrudes rightward from the right end portion of the second reading unit 94.

More specifically, as also denoted by broken lines in FIG. 9, the second protrusion 211 is provided on a left surface of the second reading unit 94 at substantially a front-rear center of a lower end portion thereof. The second protrusion 211 has a diameter substantially the same as the front-rear dimension of the second engagement portion 168 of the first frame 151. Further, the second reading unit 94 includes a protrusion 213 protruding leftward from the left surface of the second reading unit 94 at a position above the second protrusion 211 and spaced apart therefrom. The second protrusion 211 and the protrusion 213 are aligned in a direction perpendicular to the second reading surface 127. The protrusion 213 has a diameter the same as that of the second protrusion 211.

As also denoted by broken lines in FIG. 9, the fourth protrusion 212 is provided on a right surface of the second reading unit 94 at substantially a front-rear center of a lower end portion thereof. That is, the fourth protrusion 212 is disposed on the right surface of the second reading unit 94 at a position substantially the same as that of the second protrusion 211 in the front-rear direction and in the vertical direction. The fourth protrusion 212 has a diameter substantially the same as the front-rear dimension of the fourth engagement portion 188 of the second frame 152. Further, the second reading unit 94 includes a protrusion 214 protruding rightward from the right surface of the second reading unit 94 at a position above the fourth protrusion 212 and spaced apart therefrom. The fourth protrusion 212 and the protrusion 214 are aligned in the direction perpendicular to the second reading surface 127. The protrusion 214 has a diameter the same as that of the fourth protrusion 212.

As denoted by broken lines in FIG. 8, the sheet holder 92 includes protrusions 221, 222 at its left end portion. The protrusions 221, 222 are disposed spaced apart from each other in the vertical direction, and protrude leftward from the left end portion. Further, as denoted by broken lines in FIG. 9, the sheet holder 92 includes protrusions 223, 224 at its right end portion. The protrusions 223, 224 are disposed spaced apart from each other in the vertical direction, and protrudes rightward from the right end portion. That is, the protrusions 223, 224 are disposed at positions the same as those of the protrusions 221, 222, respectively, in the vertical direction and in the front-rear directions.

Figure 11:
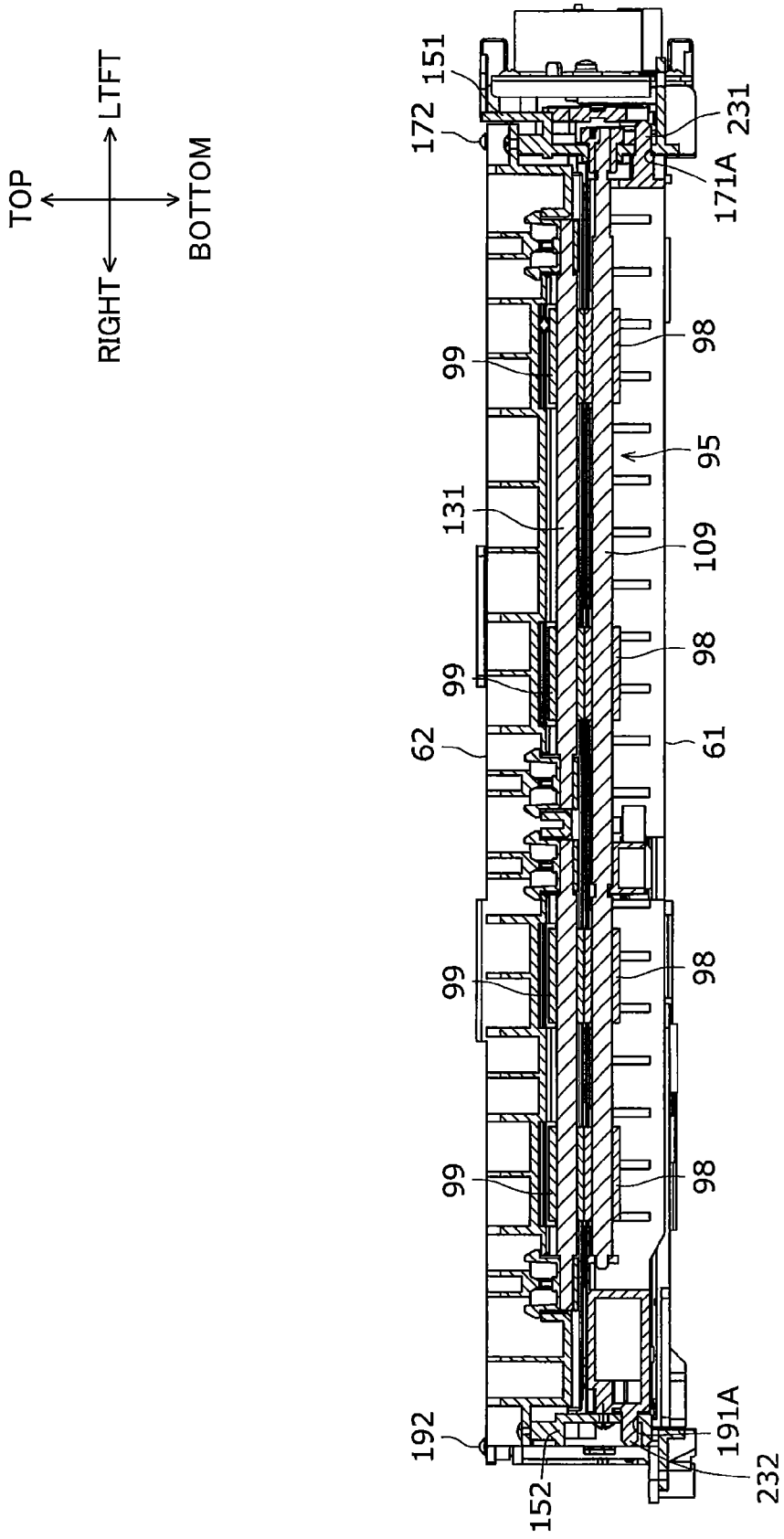
FIG. 11 is a cross-sectional view illustrating the first holder, the second holder, the first frame, and the second frame.

As illustrated in FIG. 11, the first holder 61 includes a protrusion 231 and a protrusion 232. The protrusion 231 is disposed at a rear-left end portion of the first holder 61 and protrudes leftward. The protrusion 232 is disposed at a rear-right end portion of the first holder 61 and protrudes rightward. The left end portion of the first holder 61 is an example of a fifth end, and the right end portion of the first holder 61 is an example of a seventh end.

As illustrated in FIG. 7, the second holder 62 includes an extended portion 241 and an extended portion 242. The extended portion 241 is disposed at a front-rear center of an upper-left end portion of the second holder 62, and extends leftward. The extended portion 241 is formed with a through-hole 243 penetrating therethrough in the vertical direction. The extended portion 242 is disposed at a front-rear center of an upper-right end portion of the second holder 62, and extends rightward. The extended portion 242 is formed with a through-hole 244 penetrating therethrough in the vertical direction. The left end portion of the second holder 62 is an example of a sixth end, and the right end portion of the second holder 62 is an example of an eighth end.

In manufacturing the image reading apparatus 1, firstly, the first reading unit 93, the drive shaft 101 inserted through the conveying drive rollers 96, and the drive shaft 109 inserted through the discharge drive rollers 98, which are illustrated in FIG. 4, are assembled to the first holder 61. Further, the driven shaft 121 inserted through the conveying driven rollers 97, the second biasing portion 130, the driven shaft 131 inserted through the discharge driven rollers 99, which are illustrated in FIG. 4, are assembled to the second holder 62.

Next, the first frame 151 (see FIGS. 6, 8, and 11) is disposed leftward of the first holder 61. Subsequently, a positional relationship between the first holder 61 and the first frame 151 is adjusted such that vertical and front-rear positions of the first protrusion 201 of the first reading unit 93 coincide with those of the first engagement portion 165 of the first frame 151; vertical and front-rear positions of the protrusion 203 of the first reading unit 93 coincide with those of the recess 167 of the first frame 151; vertical and front-rear positions of the protrusion 231 of the first holder 61 coincide with those of the fifth engagement portion 171A of the first frame 151; and vertical and front-rear positions of a protrusion (not illustrated) protruding leftward from a front-left end portion of the first holder 61 coincide with those of the fifth engagement portion 171B of the first frame 151.

Thereafter, the first holder 61 and the first frame 151 are brought close to each other in the left-right direction. As a result, the first protrusion 201 of the first reading unit 93 is inserted into the first engagement portion 165 of the first frame 151; the protrusion 203 of the first reading unit 93 is inserted into the recess 167 of the first frame 151; the protrusion 231 of the first holder 61 is inserted into the fifth engagement portion 171A of the first frame 151; and the protrusion (not illustrated) of the first holder 61 is inserted into the fifth engagement portion 171B of the first frame 151.

Then, the second frame 152 (see FIGS. 6, 9 and 11) is disposed rightward of the first holder 61. Subsequently, a positional relationship between the first holder 61 and the second frame 152 is adjusted such that vertical and front-rear positions of the third protrusion 202 of the first reading unit 93 coincide with those of the third engagement portion 185 of the second frame 152; vertical and front-rear positions of the protrusion 204 of the first reading unit 93 coincide with those of the recess 187 of the second frame 152; vertical and front-rear positions of the protrusion 232 of the first holder 61 coincide with those of the seventh engagement portion 191A of the second frame 152; and vertical and front-rear positions of a protrusion (not illustrated) protruding rightward from a front-right end portion of the first holder 61 coincide with those of the seventh engagement portion 191B of the second frame 152.

Thereafter, the first holder 61 and the second frame 152 are brought close to each other in the left-right direction. As a result, the third protrusion 202 of the first reading unit 93 is inserted into the third engagement portion 185 of the second frame 152; the protrusion 204 of the first reading unit 93 is inserted into the recess 187 of the second frame 152; the protrusion 232 of the first holder 61 is inserted into the seventh engagement portion 191A of the second frame 152; and the protrusion (not illustrated) of the first holder 61 is inserted into the seventh engagement portion 191B of the second frame 152.

Then, the second reading unit 94 is disposed above the first holder 61. At this time, the second protrusion 211 and the protrusion 213 of the second reading unit 94 are inserted into the second engagement portion 168 of the first frame 151 from above. Further, the fourth protrusion 212 and the protrusion 214 of the second reading unit 94 are inserted into the fourth engagement portion 188 of the second frame 152 from above.

Subsequently, the sheet holder 92 is disposed above the first holder 61. Then, the protrusions 221, 222 of the sheet holder 92 are inserted into the third recessed portion 163 of the first frame 151 from above, and the protrusions 223, 224 of the sheet holder 92 are inserted into the sixth recessed portion 183 of the second frame 152 from above.

Thereafter, the second holder 62 is disposed above the first holder 61. Then, the second holder 62 is inserted between the first frame 151 and the second frame 152. At this time, the sixth engagement portion 172 of the first frame 151 is inserted through the through-hole 243 of the second holder 62, while the eighth engagement portion 192 of the second frame 152 is inserted through the through-hole 244 of the second holder 62 (see FIG. 7).

Figure 10:
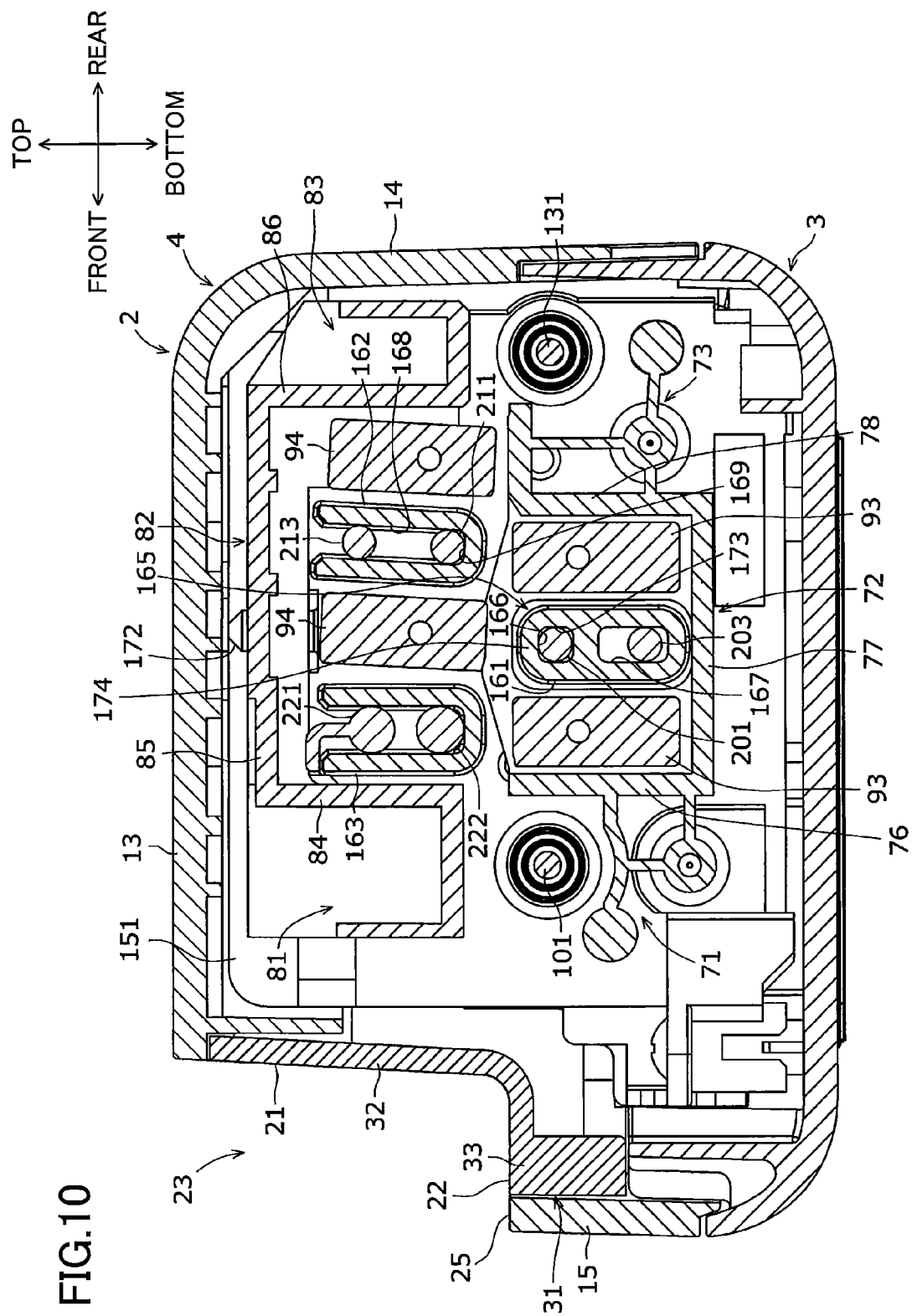
FIG. 10 is a cross-sectional view of a left end portion of the image reading apparatus taken along a plane extending in the front-rear direction.

In this state, as illustrated in FIG. 10 (only the first frame 151 side is illustrated), the first protrusion 201 and the third protrusion 202 of the first reading unit 93 abut against, from below, the first abutment surface 166 of the first frame 151 and the third abutment surface 186 of the second frame 152, respectively, by the biasing force of the first biasing portion 103 illustrated in FIG. 4. Further, the second protrusion 211 and the fourth protrusion 212 of the first reading unit 94 abut against, from above, the second abutment surface 169 of the first frame 151 and the fourth abutment surface 189 of the second frame 152, respectively, by the biasing force of the second biasing portion 130 illustrated in FIG. 4.

In a state where the second reading unit 94 is retained by the first frame 151 and the second frame 152, the second protrusion 211 and the protrusion 213 of the second reading unit 94 have been inserted into the second engagement portion 168 of the first frame 151. Further, the fourth protrusion 212 and the protrusion 214 of the second reading unit 94 have been inserted into the fourth engagement portion 188 of the second frame 152. The second engagement portion 168 and the fourth engagement portion 188 extend in the direction perpendicular to the second reading surface 127 of the second reading unit 94. Therefore, the second reading unit 94 moves in the direction perpendicular to the second reading surface 127 relative to the first frame 151 and the second frame 152.

Further, in a state where the sheet holder 92 is retained by the first frame 151 and the second frame 152, the protrusions 221, 222 of the sheet holder 92 have been inserted into the third recessed portion 163 of the first frame 151. Further, the protrusions 223, 224 of the sheet holder 92 have been inserted into the sixth recessed portion 183 of the second frame 152. The third recessed portion 163 and the sixth recessed portion 183 extend in the vertical direction. Therefore, the sheet holder 92 moves in the vertical direction relative to the first frame 151 and the second frame 152.

<Operational Effects>

(1) As described above, insertion of the first protrusion 201 of the first reading unit 93 into the first engagement portion 165 of the first frame 151 allows the left end portion of the first reading unit 93 to be engaged with the first frame 151. Further, insertion of the second protrusion 211 of the second reading unit 94 into the second engagement portion 168 of the first frame 151 allows the left end portion of the second reading unit 94 to be engaged with the first frame 151. Hence, a relative position between the left end portion of the first reading unit 93 and the left end portion of the second reading unit 94 can be maintained.

Insertion of the third protrusion 202 of the first reading unit 93 into the third engagement portion 185 of the second frame 152 allows the right end portion of the first reading unit 93 to be engaged with the second frame 152. Further, insertion of the fourth protrusion 212 of the second reading unit 94 into the fourth engagement portion 188 of the second frame 152 allows the right end portion of the second reading unit 94 to be engaged with the second frame 152. Hence, a relative position between the right end portion of the first reading unit 93 and the right end portion of the second reading unit 94 can be maintained.

Thus, a relative position between the first reading unit 93 and the second reading unit 94 can be maintained. As a result, image reading accuracy of the first reading unit 93 and the second reading unit 94 can be enhanced.

(2) Further, the first reading unit 93 is biased toward the conveying path 141, so that the first protrusion 201 of the first reading unit 93 abuts against the first abutment surface 166 of the first frame 151, and the third protrusion 202 of the first reading unit 93 abuts against the third abutment surface 186 of the second frame 152.

Further, the second reading unit 94 is biased toward the conveying path 141, so that the second protrusion 211 of the second reading unit 94 abuts against the second abutment surface 169 of the first frame 151, and the fourth protrusion 212 of the second reading unit 94 abuts against the fourth abutment surface 189 of the second frame 152.

Therefore, the relative position between the first reading unit 93 and the second reading unit 94 is determined by a relative position between the first abutment surface 166 of the first frame 151 and the second abutment surface 169 of the first frame 151, and a relative position between the third abutment surface 186 of the second frame 152 and the fourth abutment surface 189 of the second frame 152. Accordingly, the relative position between the first reading unit 93 and the second reading unit 94 can be maintained with accuracy.

(3) The first reading unit 93 and the second reading unit 94 are contact-type image sensor units having the same configurations. Thus, a dimensional tolerance of the first reading unit 93 and a dimensional tolerance of the second reading unit 94 can be made the same. This can eliminate a variation in the relative position between the first reading unit 93 and the second reading unit 94 which may be caused due to a variation in the dimensional tolerance of the first reading unit 93 and a variation in the dimensional tolerance of the second reading unit 94. Further, cost for manufacturing the image reading apparatus 1 can be reduced by common use of the parts.

(4) The second engagement portion 168 and the fourth engagement portion 188 are each inclined such that the upper portion thereof is positioned on a more downstream side than the lower portion thereof in a sheet conveyance direction (i.e. front-rear direction).

With this configuration, the second reading unit 94 can be set in an inclined state such that an upstream end portion of the second reading unit 94 is positioned higher than a downstream end portion thereof. This allows the leading edge of the sheet S conveyed on the conveying path 141 to abut against the second reading surface 127 of the second reading unit 94. Thus, even if there forms a gap between the second reading surface 127 and a part of the second reading unit 94 positioned upstream of the second reading surface 127 in the sheet conveyance direction, the leading edge of the sheet S can be prevented from entering into the gap. Thus, the sheet S can be conveyed in an appropriate manner.

(5) The image reading apparatus 1 includes the front chute 74 and the rear chute 79 for guiding the conveyance of the sheet S being conveyed on the conveying path 141. The front chute 74 and the rear chute 79 are formed in the first holder 61. The first holder 61 is supported by the first frame 151 and the second frame 152.

With this configuration, the first holder 61 is supported by the first frame 151 that supports the first reading unit 93 and the second reading unit 94, and also supported by the second frame 152 that supports the first reading unit 93 and the second reading unit 94. By supporting the first holder 61 with members the same as those supporting the first reading unit 93 and the second reading unit 94, the relative positional accuracy between the front and rear chutes 74, 79 and the first and second reading units 93, 94 can be enhanced. This enhances conveyance accuracy of the sheet S to the first reading unit 93 and the second reading unit 94, with the result that reading accuracy of the sheet S can be enhanced.

(6) The image reading apparatus 1 includes the first holder 61 that accommodates the first reading unit 93, and the second holder 62 that accommodates the second reading unit 94. The first frame 151 integrally includes the fifth engagement portions 171A, 171B that are engageable with the left end portion of the first holder 61, and the sixth engagement portion 172 that is engageable with the left end portion of the second holder 62. Further, the second frame 152 integrally includes the seventh engagement portions 191A, 191B that are engageable with the right end portion of the first holder 61, and the eighth engagement portion 192 that is engageable with the right end portion of the second holder 62.

With this configuration, a relative position between the left end portion of the first holder 61 and the left end portion of the second holder 62 can be maintained by the first frame 151. Further, a relative position between the right end portion of the first holder 61 and the right end portion of the second holder 62 can be maintained by the second frame 152. This can maintain a relative position between the first holder 61 and the second holder 62.

<Modifications>

Although the embodiment of the present invention has been described above, the present invention is not limited to the above specific embodiment. Various modifications are conceivable. In the following description, only parts differing from those of the embodiment will be described in detail.

Figure 12:
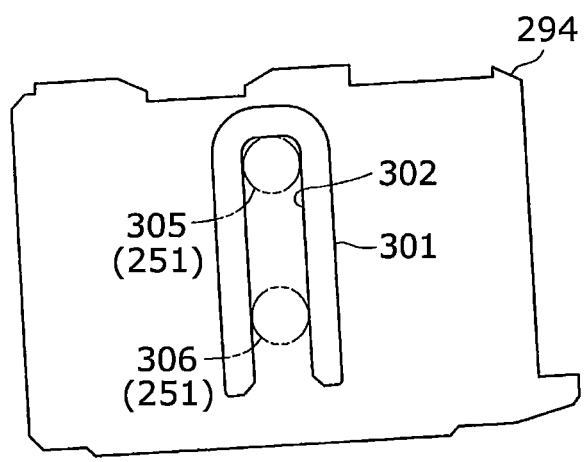
FIG. 12 is a left side view of a second reading unit provided in an image reading apparatus according to a first modification of the present invention.
Figure 13:
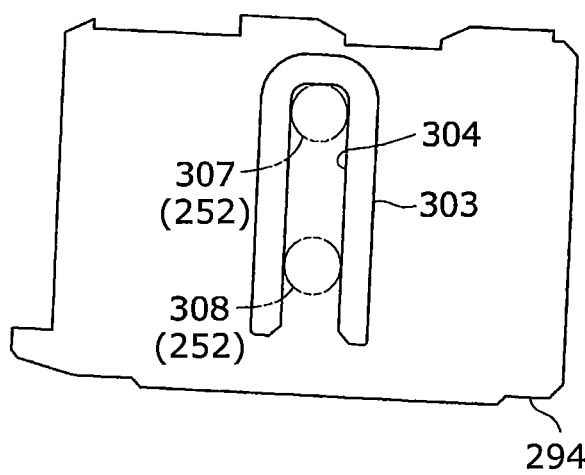
FIG. 13 is a right side view of the second reading unit provided in the image reading apparatus according to the first modification.

According to a first modification to the embodiment, a second reading unit 294 has a configuration illustrated in FIGS. 12 and 13.

In this configuration, as illustrated in FIG. 12, the second reading unit 294 includes a recessed portion 301 protruding leftward from a left surface thereof. An engagement portion 302 (as an example of a second grooved portion) is formed in the recessed portion 301. The engagement portion 302 is in a form of a recess that is recessed rightward from a left surface of the recessed portion 301 and opened downward. Further, as illustrated in FIG. 13, the second reading unit 294 includes a recessed portion 303 protruding rightward from a right surface thereof. An engagement portion 304 (as an example of a fourth grooved portion) is formed in the recessed portion 303. The engagement portion 304 is in a form of a recess that is recessed leftward from a right surface of the recessed portion 303 and opened downward.

As denoted by broken lines in FIG. 12, a first frame 251 includes protrusions 305, 306 protruding rightward from a right surface thereof. Further, as denoted by broken lines in FIG. 13, a second frame 252 includes protrusions 307, 308 protruding leftward from a left surface thereof. The protrusion 305 is an example of a second engagement portion, and the protrusion 307 is an example of a fourth engagement portion.

The protrusions 305, 306 of the first frame 251 are inserted into the engagement portion 302 of the second reading unit 294, and the protrusions 307, 308 of the second frame 252 are inserted into the engagement portion 304 of the second reading unit 294, thereby allowing the second reading unit 294 to be engaged with the first frame 251 and the second frame 252.

Figure 14:
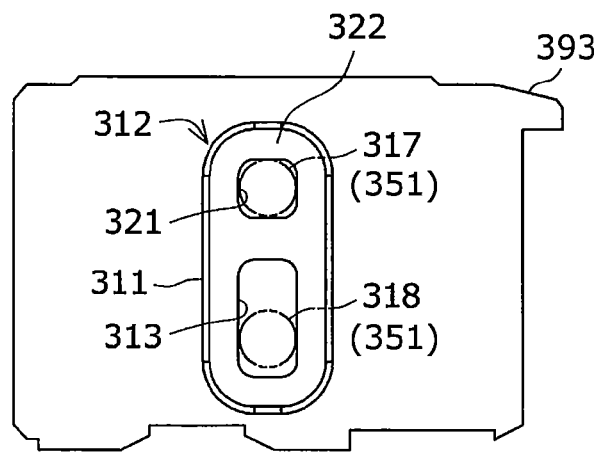
FIG. 14 is a left side view of a first reading unit provided in an image reading apparatus according to a second modification of the present invention.
Figure 15:
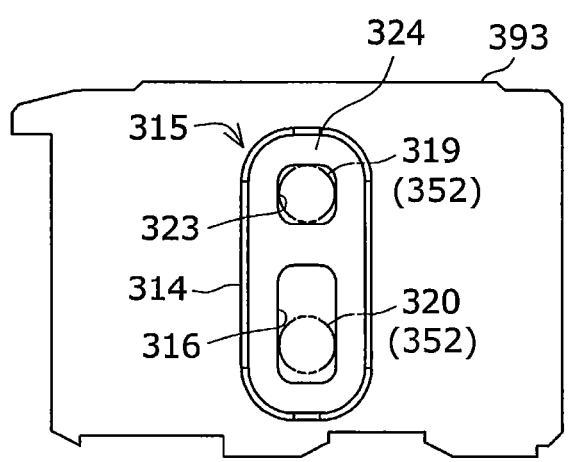
FIG. 15 is a right side view of the first reading unit provided in the image reading apparatus according to the second modification.

According to a second modification to the embodiment, a first reading unit 393 has a configuration illustrated in FIGS. 14 and 15.

In this configuration, as illustrated in FIG. 14, the first reading unit 393 includes a recessed portion 311 protruding leftward from a left surface thereof. An engagement portion 312 (as an example of a first grooved portion) is formed in the recessed portion 311. More specifically, a recess 321 is formed at an upper portion of the recessed portion 311, and the recess 321 and an annular portion 322 surrounding the recess 321 constitute the engagement portion 312. The engagement portion 312 is in a form of a recess recessed rightward. Further, a recess 313 is formed in the recessed portion 311 at a position below and spaced apart from the recess 321.

Further, as illustrated in FIG. 15, the first reading unit 393 includes a recessed portion 314 protruding rightward from a right surface thereof. An engagement portion 315 (as an example of a third grooved portion) is formed in the recessed portion 314. More specifically, a recess 323 is formed at an upper portion of the recessed portion 314, and the recess 323 and an annular portion 324 surrounding the recess 323 constitute the engagement portion 315. The engagement portion 315 is in a form of a recess recessed leftward. Further, a recess 316 is formed in the recessed portion 314 at a position below and spaced apart from the recess 323.

As denoted by broken lines in FIG. 14, a first frame 351 includes protrusions 317, 318 protruding rightward from a right surface thereof. Further, as denoted by broken lines in FIG. 15, a second frame 352 includes protrusions 319, 320 protruding leftward from a left surface thereof. The protrusion 317 is an example of a first engagement portion, and the protrusion 319 is an example of a third engagement portion.

The protrusions 317, 318 of the first frame 351 are inserted into the engagement portion 312 and the recess 313 of the first reading unit 393, respectively, and the protrusions 319, 320 of the second frame 352 are inserted into the engagement portion 315 and the recess 316 of the first reading unit 393, respectively, thereby allowing the first reading unit 393 to be engaged with the first frame 351 and the second frame 352.

Further, in FIG. 1, the image reading apparatus 1 is horizontally installed. However, the image reading apparatus 1 may be vertically installed.

While the present invention has been described in detail with reference to the embodiments thereof, it would be apparent to those skilled in the art that various changes and modifications may be made therein without departing from the spirit of the present invention.

What is claimed is:

1. An image reading apparatus comprising:
   a conveyor configured to convey a sheet along a conveying path, the conveyor including a roller, and a shaft configured to support the roller, the shaft extending in a prescribed direction and defining a first side and a second side opposite to the first side in the prescribed direction;
   a first reading unit configured to read an image from a first surface of the sheet conveyed by the conveyor along the conveying path, the first reading unit extending in the prescribed direction and having a first end on the first side and a third end on the second side;
   a second reading unit configured to read an image from a second surface of the sheet conveyed by the conveyor along the conveying path, the second reading unit extending in the prescribed direction and having a second end on the first side and a fourth end on the second side, the second reading unit being disposed opposite to the first reading unit with the conveying path interposed therebetween;
   a first frame comprising:
      a first base portion;
      a first engagement portion provided at the first base portion and configured to be engaged with the first end; and
      a second engagement portion provided at the first base portion and configured to be engaged with the second end; and
   a second frame comprising:
      a second base portion;
      a third engagement portion provided at the second base portion configured to be engaged with the third end; and
      a fourth engagement portion provided at the second base portion configured to be engaged with the fourth end.

2. The image reading apparatus according to claim 1, wherein the first reading unit comprises:
- a first protrusion protruding from the first end toward the first side and configured to be engaged with the first engagement portion, the first engagement portion being in a form of a recess that allows the first protrusion to be inserted thereinto; and
- a third protrusion protruding from the third end toward the second side and configured to be engaged with the third engagement portion, the third engagement portion being in a form of a recess that allows the third protrusion to be inserted thereinto, wherein the second reading unit comprises:
- a second protrusion protruding from the second end toward the first side and configured to be engaged with the second engagement portion, the second engagement portion being in a form of a recess that allows the second protrusion to be inserted thereinto; and
- a fourth protrusion protruding from the fourth end toward the second side and configured to be engaged with the fourth engagement portion, the fourth engagement portion being in a form of a recess that allows the fourth protrusion to be inserted thereinto.

3. The image reading apparatus according to claim 2, wherein the first engagement portion comprises a first abutment surface configured to abut against the first protrusion, the second engagement portion comprises a second abutment surface configured to abut against the second protrusion, the third engagement portion comprises a third abutment surface configured to abut against the third protrusion, and the fourth engagement portion comprises a fourth abutment surface configured to abut against the fourth protrusion.

4. The image reading apparatus according to claim 3, further comprising:
- a first biasing portion configured to bias the first reading unit toward the conveying path; and
- a second biasing portion configured to bias the second reading unit toward the conveying path, and
- wherein, assuming that the second reading unit is disposed above the first reading unit, the first abutment surface is positioned at an upper end of the first engagement portion, the second abutment surface is positioned at a lower end of the second engagement portion, the third abutment surface is positioned at an upper end of the third engagement portion, and the fourth abutment surface is positioned at a lower end of the fourth engagement portion.

5. The image reading apparatus according to claim 4, wherein the first reading unit is configured of a contact-type image sensor unit, and the second reading unit is configured of a contact type image sensor unit having a configuration the same as that of the first reading unit.

6. The image reading apparatus according to claim 3, wherein the second reading unit is disposed above the first reading unit,
- wherein the first engagement portion and the third engagement portion are each in a form of a recess recessed in the prescribed direction,
- wherein the second engagement portion and the fourth engagement portion are each in a form of a recess recessed in the prescribed direction and opening upward.

7. The image reading apparatus according to claim 6, wherein the sheet is conveyed along the conveying path in a sheet conveyance direction,
- wherein the second engagement portion and the fourth engagement portion are each inclined such that an upper portion thereof is positioned on a more downstream side in the sheet conveyance direction than an lower portion thereof.

8. The image reading apparatus according to claim 1, wherein the first reading unit comprises a first grooved portion provided at the first end, and a third grooved portion provided at the third end,
- wherein the first engagement portion is a protrusion configured to be inserted into the first grooved portion, and the third engagement portion is a protrusion configured to be inserted into the third grooved portion.

9. The image reading apparatus according to claim 1, wherein the second reading unit comprises a second grooved portion provided at the second end, and a fourth grooved portion provided at the fourth end,
- wherein the second engagement portion is a protrusion configured to be inserted into the second grooved portion, and the fourth engagement portion is a protrusion configured to be inserted into the fourth grooved portion.

10. The image reading apparatus according to claim 1, wherein the conveyor further includes a chute configured to guide the sheet conveyed along the conveying path, the chute being supported by the first frame and the second frame.

11. The image reading apparatus according to claim 10, further comprising:
- a first accommodating portion configured to accommodate the first reading unit and having a fifth end on the first side and a seventh end on the second side; and
- a second accommodating portion configured to accommodate the second reading unit and having a sixth end on the first side and an eighth end on the second side,
- wherein the first frame comprises a fifth engagement portion configured to be engaged with the fifth end, and a sixth engagement portion configured to be engaged with the sixth end,
- wherein the second frame comprises a seventh engagement portion configured to be engaged with the seventh end, and an eighth engagement portion configured to be engaged with the eighth end.

12. The image reading apparatus according to claim 11, wherein the chute is provided at the first accommodating portion.

13. A method for manufacturing an image reading apparatus comprising: a conveyor configured to convey a sheet along a conveying path, the conveyor including a roller, and a shaft configured to support the roller, the shaft extending in a prescribed direction and defining a first side and a second side opposite to the first side in the prescribed direction; a first reading unit configured to read an image from a first surface of the sheet conveyed by the conveyor along the conveying path, the first reading unit extending in the prescribed direction and having a first end on the first side and a third end on the second side, the first reading unit comprising a first protrusion protruding from the first end in the prescribed direction and a third protrusion protruding from the third end in the prescribed direction; a second reading unit configured to read an image from a second surface of the sheet conveyed by the conveyor along the conveying path, the second reading unit extending in the prescribed direction and having a second end on the first side and a fourth end on the second side, the second reading unit comprising a second protrusion protruding from the second end in the prescribed direction and a fourth protrusion protruding from the fourth end in the prescribed direction, the second reading unit being disposed opposite to the first reading unit with the conveying path interposed therebetween; a first frame comprising a first engagement portion that is in a form of a recess recessed in the prescribed direction and a second engagement portion that is in a form of a recess recessed in the prescribed direction and opening upward; and a second frame comprising a third engagement portion that is in a form of a recess recessed in the prescribed direction and a fourth engagement portion that is in a form of a recess recessed in the prescribed direction and opening upward, the method comprising:
bringing the first end and the first frame close to each other in the prescribed direction to insert the first protrusion into the first engagement portion;
bringing the third end and the second frame close to each other in the prescribed direction to insert the third protrusion into the third engagement portion; and
positioning the second reading unit above the first reading unit and between the first frame and the second frame to insert the second protrusion and the fourth protrusion into the second engagement portion and the fourth engagement portion, respectively.

14. An image reading apparatus comprising:
a first reading unit configured to read an image from a first surface of a sheet conveyed along a conveying path in a sheet conveyance direction, the sheet having a width extending in a widthwise direction perpendicular to the sheet conveyance direction and defining a first side and a second side opposite to the first side in the widthwise direction, the first reading unit extending in the widthwise direction and having a first end on the first side and a third end on the second side;
a second reading unit configured to read an image from a second surface of the sheet, the second reading unit extending in the widthwise direction and having a second end on the first side and a fourth end on the second side, the second reading unit being disposed opposite to the first reading unit with the conveying path interposed therebetween;
a first frame comprising:
a first base portion;
a first engagement portion provided at the first base portion and configured to be engaged with the first end; and
a second engagement portion provided at the first base portion and configured to be engaged with the second end; and
a second frame comprising:
a second base portion;
a third engagement portion provided at the second base portion and configured to be engaged with the third end; and
a fourth engagement portion provided at the second base portion and configured to be engaged with the fourth end.

* * * * *